(12) United States Patent
Guo et al.

(10) Patent No.: US 8,824,081 B1
(45) Date of Patent: Sep. 2, 2014

(54) DISK DRIVE EMPLOYING RADIALLY COHERENT REFERENCE PATTERN FOR SERVO BURST DEMODULATION AND FLY HEIGHT MEASUREMENT

(75) Inventors: Guoxiao Guo, Irvine, CA (US); Jie Yu, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 121 days.

(21) Appl. No.: 13/418,966

(22) Filed: Mar. 13, 2012

(51) Int. Cl.
*G11B 5/02* (2006.01)

(52) U.S. Cl.
USPC ......... 360/55; 360/75; 360/77.06; 360/77.08; 360/86

(58) Field of Classification Search
None
See application file for complete search history.

(56) References Cited

U.S. PATENT DOCUMENTS

| | | | |
|---|---|---|---|
| 5,377,058 A | 12/1994 | Good et al. | |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |
| 6,347,018 B1 | 2/2002 | Kadlec et al. | |
| 6,369,972 B1 | 4/2002 | Codilian et al. | |
| 6,369,974 B1 | 4/2002 | Asgari et al. | |
| 6,462,896 B1 | 10/2002 | Codilian et al. | |
| 6,476,996 B1 | 11/2002 | Ryan | |
| 6,484,577 B1 | 11/2002 | Bennett | |
| 6,493,169 B1 | 12/2002 | Ferris et al. | |
| 6,496,324 B1 | 12/2002 | Golowka et al. | |
| 6,498,698 B1 | 12/2002 | Golowka et al. | |
| 6,501,606 B2 | 12/2002 | Boutaghou et al. | |
| 6,507,450 B1 | 1/2003 | Elliott | |
| 6,519,102 B1 | 2/2003 | Smith et al. | |
| 6,534,936 B2 | 3/2003 | Messenger et al. | |
| 6,538,839 B1 | 3/2003 | Ryan | |

(Continued)

*Primary Examiner* — Muhammad N Edun

(57) ABSTRACT

A disk drive is disclosed comprising a disk comprising a plurality of data tracks defined by servo sectors. Each servo sector comprises a periodic preamble recorded at a first frequency, servo data, a periodic reference pattern recorded at a second frequency different from the first frequency, and at least one servo burst. A servo sector is processed by processing the periodic preamble to extract the servo data, demodulating the servo burst in response to the periodic reference pattern, generating a position error signal based on the extracted servo data and the demodulated servo burst, and measuring a fly height of the head based on the periodic reference pattern.

22 Claims, 6 Drawing Sheets

(56) References Cited

U.S. PATENT DOCUMENTS

| | | |
|---|---|---|
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,038,875 B2 | 5/2006 | Lou et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,449 B2 | 6/2006 | Riddering et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,984 B1 | 8/2007 | Patapoutian et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,324,299 B1 | 1/2008 | Schreck et al. |
| 7,330,019 B1 | 2/2008 | Bennett |
| 7,330,324 B2 | 2/2008 | Morinaga et al. |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,369,340 B1 | 5/2008 | Dang et al. |
| 7,388,728 B1 | 6/2008 | Chen et al. |
| 7,391,583 B1 | 6/2008 | Sheh et al. |
| 7,391,584 B1 | 6/2008 | Sheh et al. |
| 7,423,830 B2 | 9/2008 | Ma et al. |
| 7,426,090 B2 | 9/2008 | Yamashita et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,854 B2 | 12/2008 | Yamashita et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |

(56) References Cited

U.S. PATENT DOCUMENTS

| | | |
|---|---|---|
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,135 B1 | 5/2010 | Sutardja et al. |
| 7,715,138 B1 | 5/2010 | Kupferman |
| 7,719,781 B2 | 5/2010 | Ehrlich et al. |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,835,104 B2 | 11/2010 | Yamashita et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,880,992 B2 | 2/2011 | Ozturk et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 7,986,487 B1 | 7/2011 | Madden et al. |
| 7,995,304 B2 | 8/2011 | Ozturk et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,054,573 B2 | 11/2011 | Mathew et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,300,349 B2 | 10/2012 | Mathew et al. |
| 8,315,005 B1 | 11/2012 | Zou et al. |
| 8,315,007 B1 * | 11/2012 | Sutardja et al. ............. 360/75 |
| 8,320,069 B1 | 11/2012 | Knigge et al. |
| 8,325,432 B2 | 12/2012 | Mathew et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 2003/0043491 A1 | 3/2003 | Riddering et al. |
| 2006/0056091 A1 | 3/2006 | Nagano et al. |
| 2007/0230014 A1 | 10/2007 | Yamashita et al. |
| 2007/0230015 A1 | 10/2007 | Yamashita et al. |
| 2007/0268615 A1 | 11/2007 | McFadyen et al. |
| 2008/0130159 A1 | 6/2008 | Dieron et al. |
| 2008/0165443 A1 | 7/2008 | Moline |
| 2008/0165446 A1 | 7/2008 | Partee |
| 2009/0153996 A1 | 6/2009 | Ellis |
| 2010/0035085 A1 | 2/2010 | Jung et al. |
| 2010/0128386 A1 | 5/2010 | Keizer et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

\* cited by examiner

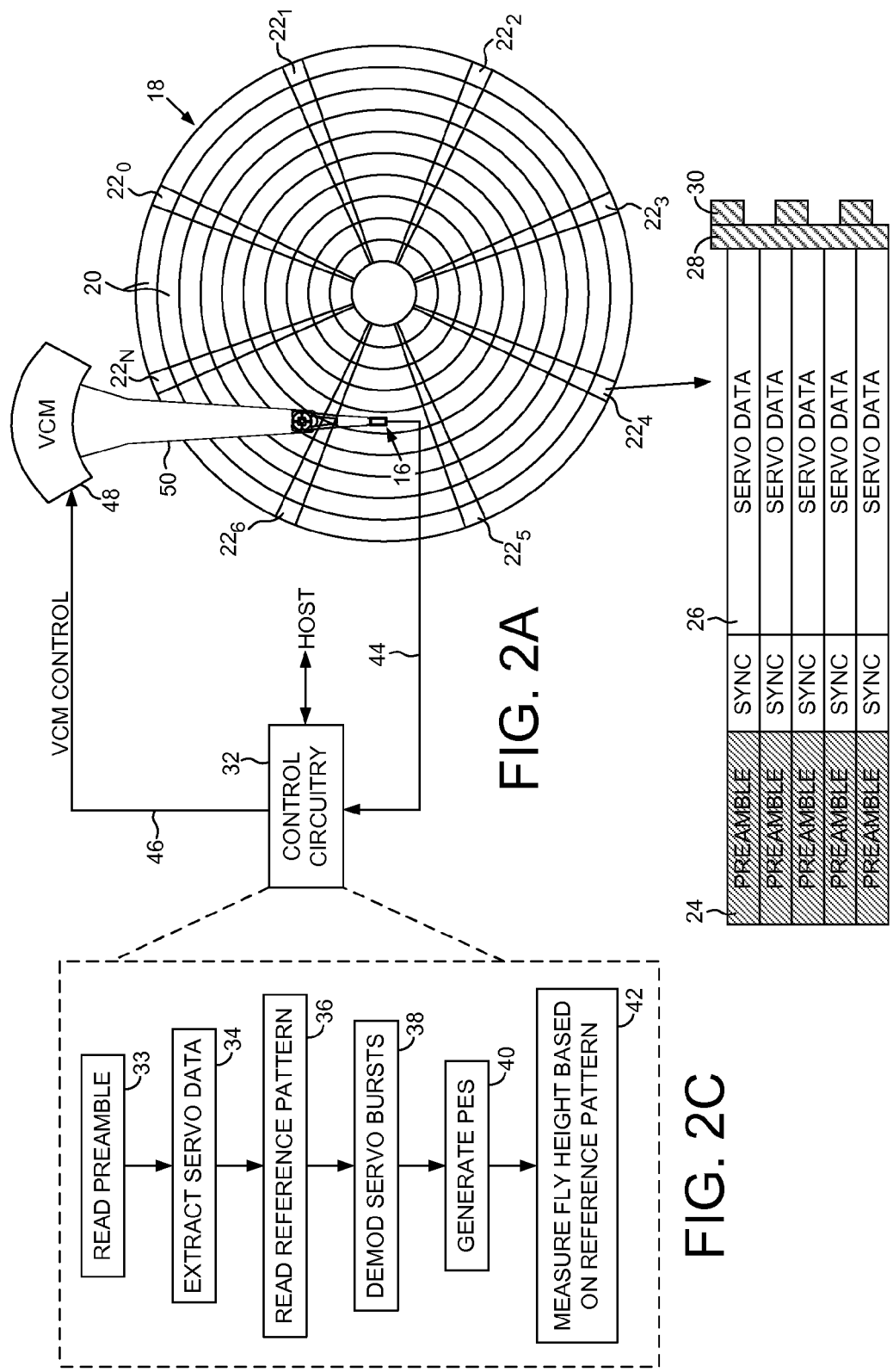

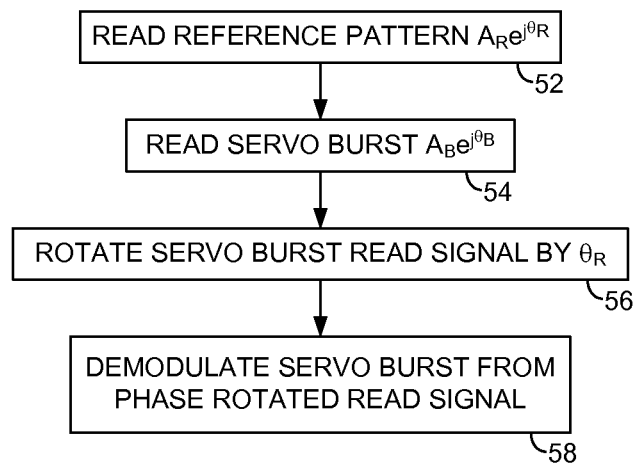
FIG. 4
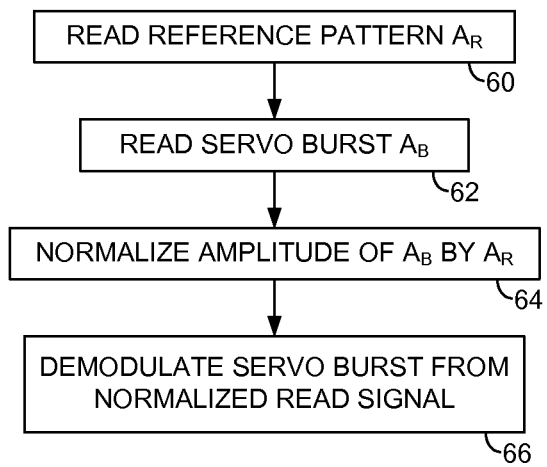
FIG. 5A
FIG. 5B

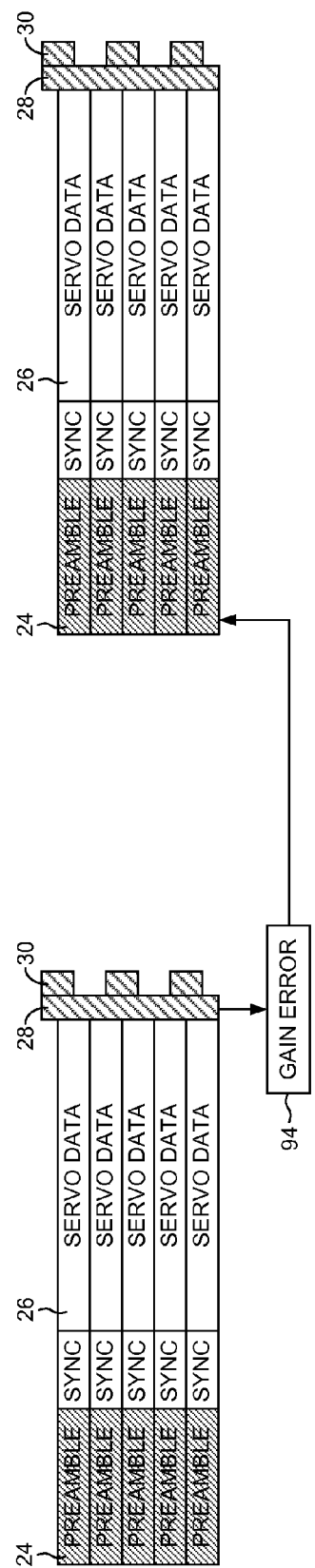

US 8,824,081 B1

DISK DRIVE EMPLOYING RADIALLY COHERENT REFERENCE PATTERN FOR SERVO BURST DEMODULATION AND FLY HEIGHT MEASUREMENT

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

FIG. 1 shows a prior art format of a disk 2 comprising a plurality of concentric servo tracks 4 defined by embedded servo sectors $6_0$-$6_N$. A plurality of data tracks are defined relative to the servo tracks 4, wherein the density of the data tracks may be different (e.g., higher) than the servo tracks 4. Each servo sector (e.g., servo sector $6_4$) comprises a preamble 8 for synchronizing gain control and timing recovery, a sync mark 10 for synchronizing to a data field 12 comprising the coarse head positioning information (such as a Gray coded track ID), and servo bursts 14 which provide fine head positioning information. The head is positioned relative to the servo tracks 4 in order to position the head over a target data track.

The ability of the disk drive to accurately recover data recorded on the disk is affected by the fly height of the head during both write and read operations. Accordingly, disk drives typically employ a suitable fly height actuator (e.g., a heater or a piezoelectric actuator) for dynamically controlling the fly height of the head during write/read operations.

BRIEF DESCRIPTION OF THE DRAWINGS

FIG. 2A shows a disk drive according to an embodiment of the present invention comprising a head actuated over a disk having a plurality of servo sectors.

FIG. 2B shows an embodiment of the present invention wherein each servo sector comprises a periodic reference pattern recorded at a frequency different from the frequency of a periodic preamble.

FIG. 2C is a flow diagram according to an embodiment of the present invention wherein the periodic reference pattern is used to demodulate servo bursts in the servo sectors as well as measure a fly height of the head.

FIG. 4 shows a harmonic ratio equation for measuring the fly height of the head according to an embodiment of the present invention.

FIG. 5A is a flow diagram according to an embodiment of the present invention wherein a phase based servo burst is rotated relative to a phase of the periodic reference pattern.

FIG. 5B is a flow diagram according to an embodiment of the present invention wherein a burst amplitude is normalized based on a reference amplitude of the periodic reference signal.

FIG. 7 shows an embodiment of the present invention wherein a gain error measured while reading the periodic reference pattern of a current servo sector is used to adjust the gain of the read signal while processing the next servo sector.

DETAILED DESCRIPTION

Figure 1:
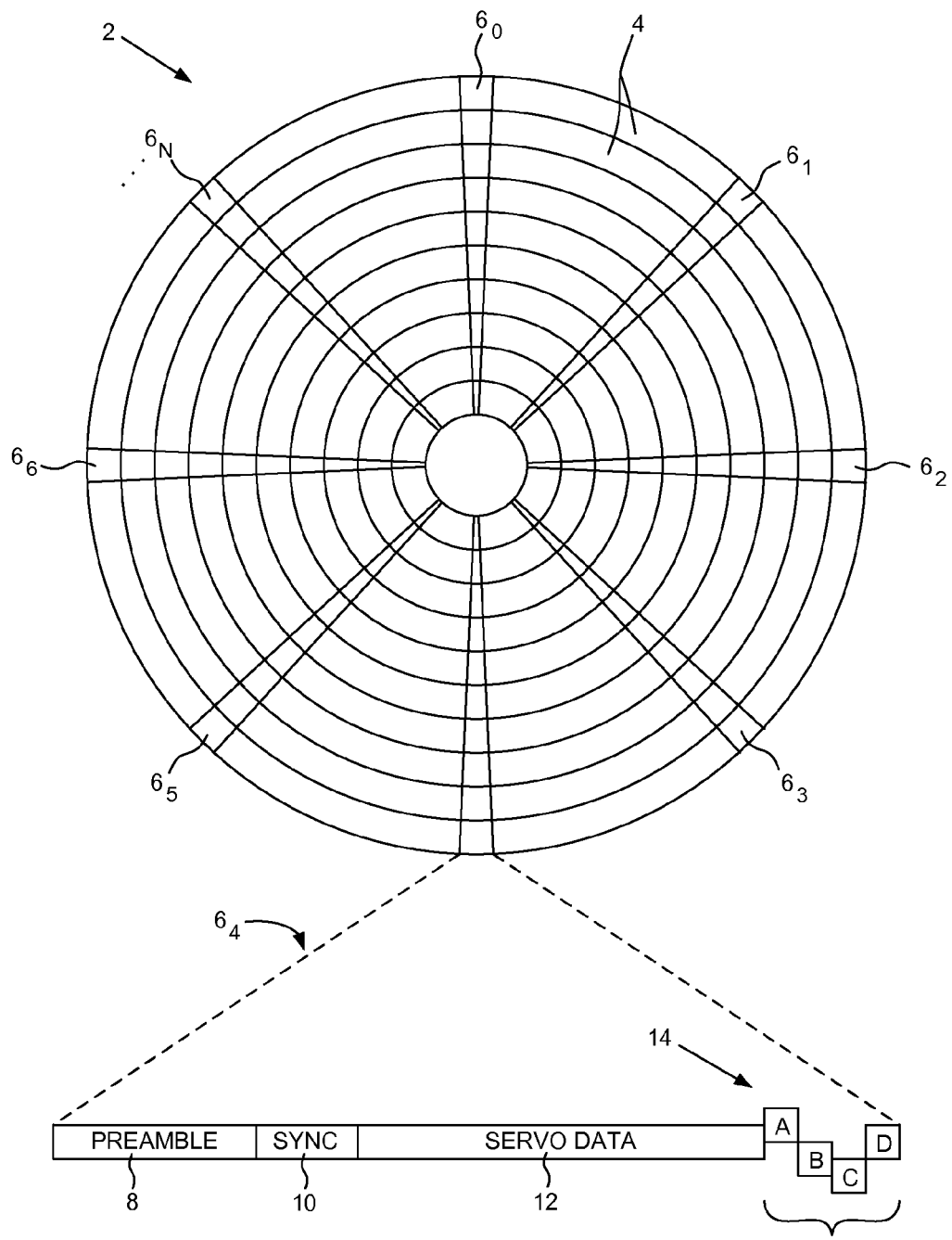
FIG. 1 shows a prior art disk format comprising a plurality of servo tracks defined by embedded servo sectors.

FIG. 2A shows a disk drive according to an embodiment of the present invention comprising a head 16 actuated over a disk 18 comprising a plurality of data tracks 20 defined by servo sectors $22_0$-$22_N$. FIG. 2B shows that each servo sector comprises a periodic preamble 24 recorded at a first frequency, servo data 26, a periodic reference pattern 28 recorded at a second frequency different from the first frequency, and at least one servo burst 30. The disk drive further comprises control circuitry 32 operable to process a servo sector by executing the flow diagram of FIG. 2C, wherein after reading the periodic preamble (block 33) the servo data is extracted (block 34). The periodic reference pattern is read (block 36), and the servo burst(s) is demodulated in response to the periodic reference pattern (block 38). A position error signal (PES) is generated based on the extracted servo data and the demodulated servo burst (block 40), and a fly height of the head is measured based on the periodic reference pattern (block 42).

In the embodiment of FIG. 2A, the control circuitry 32 processes a read signal 44 emanating from the head 16 to demodulate the servo sectors $22_0$-$22_N$ and generate the PES representing an error between the actual position of the head and a target position relative to a target track. The control circuitry 32 filters the PES using suitable compensation filters to generate a control signal 46 applied to a voice coil motor (VCM) 48 which rotates an actuator arm 50 about a pivot, thereby actuating the head 16 radially over the disk 18 in a direction that reduces the PES. The servo bursts 30 may comprise any suitable pattern, such as an amplitude based servo pattern as shown in FIG. 1, or a suitable phase based servo pattern.

Figure 3A:
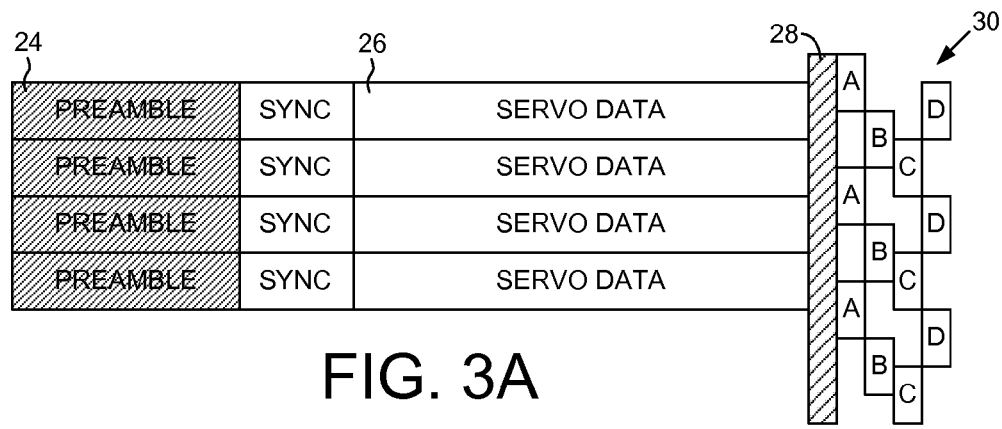
FIGS. 3A-3D show optional locations for recording the periodic reference pattern in each servo sector according to embodiments of the present invention.
Figure 3B:
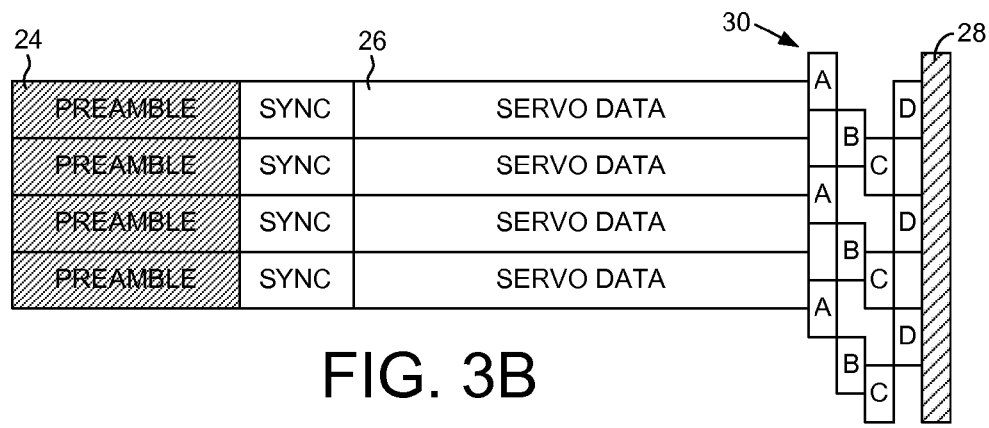
Figure 3C:
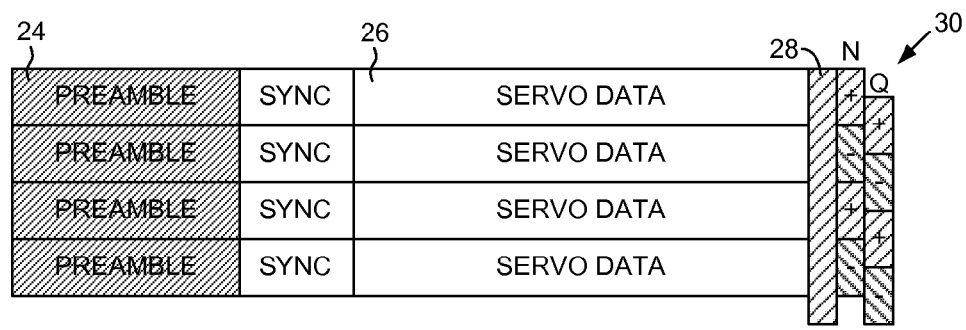
Figure 3D:
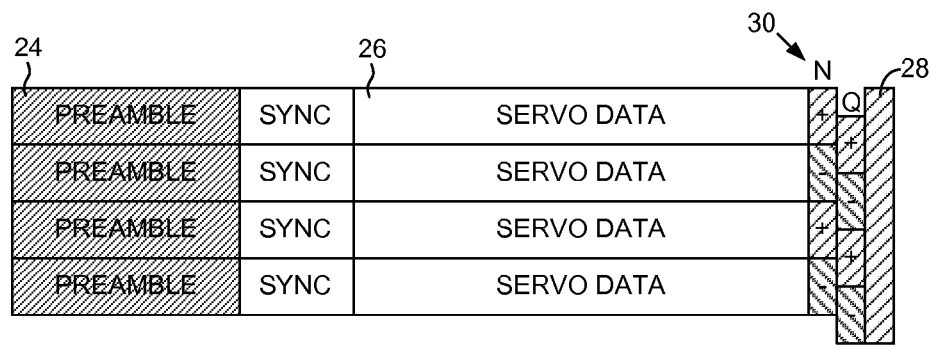

The periodic reference pattern 28 shown in FIG. 2B may be recorded at any suitable location within a servo sector. FIGS. 3A-3D show various example embodiments of the present invention with alternate locations for the periodic reference pattern 28. FIG. 3A shows an embodiment wherein the periodic reference pattern 28 is recorded prior to a plurality of amplitude based servo bursts 30, and FIG. 3B shows an embodiment wherein the periodic reference pattern 28 is recorded after a plurality of amplitude based servo bursts 30. FIG. 3C shows an embodiment wherein the periodic reference pattern 28 is recorded prior to a plurality of phase based servo bursts 30 (null-phase N and Q servo bursts), and FIG. 3D shows an embodiment wherein the periodic reference pattern 28 is recorded after a plurality of phase based servo bursts 30. In other embodiments, the periodic reference pattern may be recorded before or after any other field in the servo sector, such as before or after the preamble 24 or before the servo data 26.

The servo sectors $22_0$-$22_N$ in the embodiment of FIG. 2A may comprise any suitable format. In one embodiment, each servo sector comprises a full track address in the servo data field 26. In an alternative embodiment, the servo sectors may comprise "full servo sectors" having a normal preamble and full track address, together with "mini servo sectors" having a short preamble and/or a short track address. The mini servo sectors may be interleaved with the full servo sectors in order to increase the sample rate of the servo system while consuming less disk space.

In one embodiment, the frequency of the periodic reference pattern 28 is selected to better facilitate measuring the fly height of the head 16. For example, in one embodiment the frequency of the periodic preamble 24 (e.g., a 2T preamble) may be well suited for extracting the servo data 26 but not well suited for measuring the fly height of the head 16. Accordingly, in one embodiment the periodic reference pattern 28 is recorded in each servo sector at a frequency that is better suited for measuring the fly height of the head 16. For example, in one embodiment the periodic reference pattern 28 may be recorded at half the frequency of the preamble 24, and in one embodiment, the periodic reference pattern 28 may be recorded at the same frequency as the servo burst(s) 30. In the embodiment shown in FIG. 2B, the periodic reference pattern 28 is also radially coherent across at least four radially consecutive servo sectors. The radial coherent characteristic of the periodic reference pattern 28 enables the fly height of the head 16 to be measured independent of the radial location of the head 16.

Any suitable technique may be employed to measure the fly height of the head 16 in response to the periodic reference pattern 28. FIG. 4 shows a harmonic ratio technique for measuring the fly height of the head 16 wherein the fly height is measured by reading the periodic reference pattern 28 and measuring an amplitude of the read signal at a first harmonic ($V_A$) and at a second harmonic ($V_B$) using a suitable filtering technique. A log of the ratio ($V_A/V_B$) is then multiplied by ($\lambda/4\pi$), where $\lambda$ is the frequency of the periodic reference pattern 28 in the spatial domain (i.e., velocity/write_frequency). In one embodiment, the first harmonic is the fundamental harmonic of the periodic reference pattern 28, and the second harmonic is the third harmonic of the periodic reference pattern 28.

In addition to measuring the fly height of the head 16, the periodic reference pattern 28 may be used to demodulate the servo burst(s) 30 in any suitable manner. FIG. 5A is a flow diagram according to an embodiment of the present invention wherein the servo bursts comprises phase-based servo bursts (e.g., N and Q null-phase servo bursts as shown in FIG. 3C). When the periodic reference pattern 28 is read (block 52), a reference vector $A_R e^{j\Theta_R}$ is generated having an amplitude of $A_R$ and a phase of $\Theta_R$. When a servo burst is read (block 54), a burst vector $A_B e^{j\Theta_B}$ is generated having an amplitude of $A_B$ and a phase of $\Theta_B$. The read signal representing the burst vector $A_B e^{j\Theta_B}$ is then rotated relative to the phase $\Theta_R$ of the periodic reference pattern (block 56). The servo burst is then demodulated from the phase rotated read signal (block 58). In one embodiment, rotating the phase of the servo bursts 30 relative to the periodic reference pattern 28 helps compensate for phase error in a timing recovery algorithm that attempts to synchronize to the preamble 24 and/or the periodic reference pattern 28 of the servo sector.

FIG. 5B is a flow diagram according to an embodiment of the present invention wherein when the periodic reference pattern 28 is read (block 60), a reference amplitude $A_R$ is measured, and when a servo burst is read (block 62), a burst amplitude $A_B$ is measured. The burst amplitude $A_B$ is normalized based on the reference amplitude $A_R$ (block 64). The servo burst is then demodulated by demodulating the normalized burst amplitude $A_B$ (block 66). In one embodiment, normalizing the amplitude of the servo bursts 30 relative to the periodic reference pattern 28 helps compensate for an amplitude error in a gain control algorithm that attempts to synchronize to the preamble 24 and/or the periodic reference pattern 28 of the servo sector. Any suitable servo burst pattern may be employed in this embodiment, such as the amplitude based servo pattern shown in FIG. 3A or the phase based servo pattern shown in FIG. 3C.

Figure 6A:
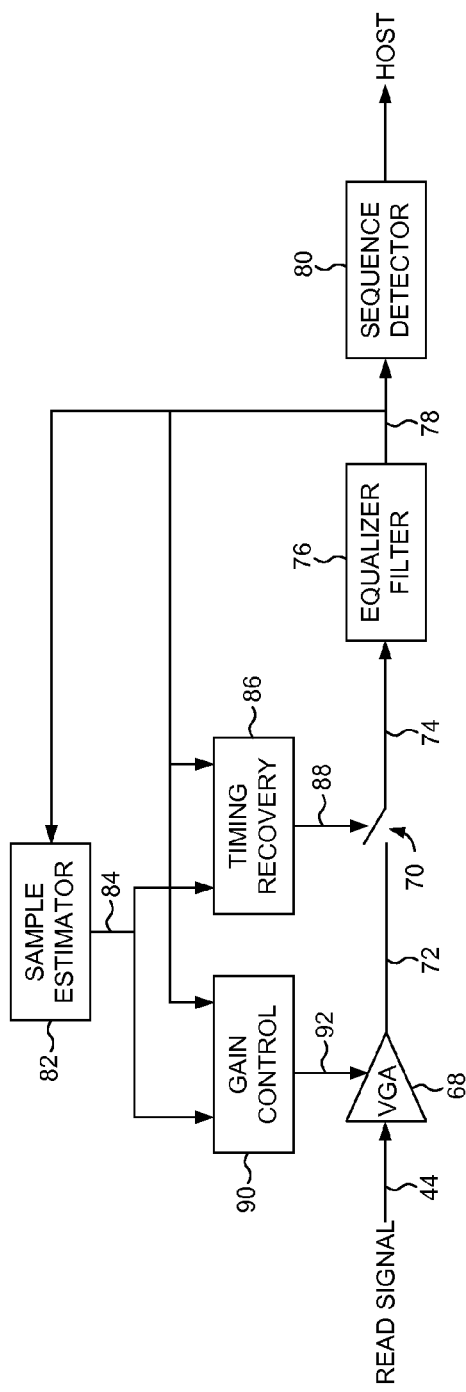
FIG. 6A shows control circuitry according to an embodiment of the present invention wherein an amplitude of the read signal is adjusted based on a measured gain error.

FIG. 6A shows control circuitry (part of control circuitry 32 of FIG. 2A) according to an embodiment of the present invention, including a variable gain amplifier (VGA) 68 for amplifying the read signal 44 emanating from the head 16. The control circuitry further comprises a sampling device 70 for sampling the amplified read signal 72 to generate a sequence of read signal sample values 74. An equalizing filter 76 shapes the read signal sample values 74 according to a desired response (e.g., a partial response or PR) to generate equalized sample values 78. The equalized sample values 78 are processed by a sequence detector 80 (e.g., a Viterbi detector) to detect an estimated bit sequence representing the data recorded on the disk. In one embodiment, the control circuitry further comprises a sample estimator 82 (e.g., a slicer) for estimating a target sample value 84 from an equalized sample value 78. The target sample value 84 and equalized sample value 78 are processed by timing recovery 86 to synchronize a sampling clock 88 to the baud rate of the data, and processed by gain control 90 to generate a VGA gain setting 92 for adjusting the gain of the VGA 68.

Figure 6B:
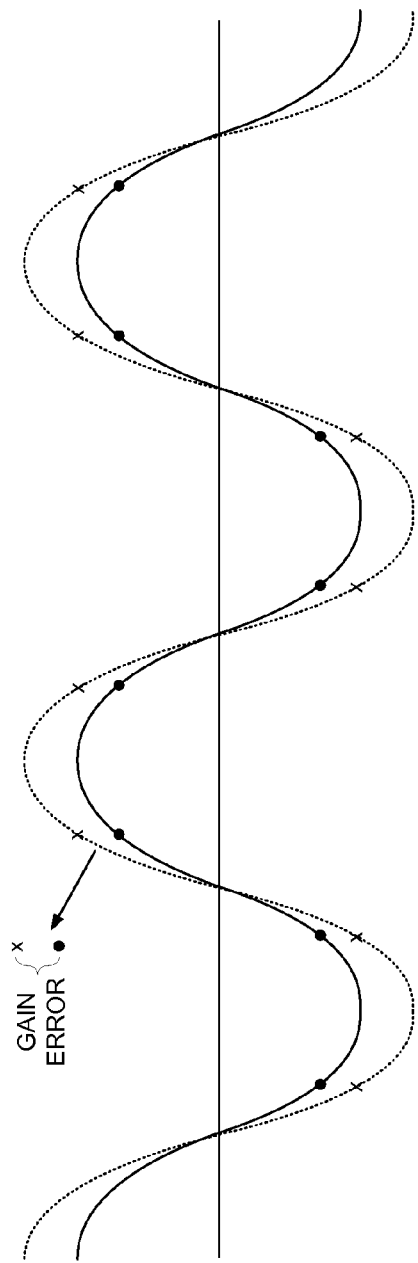
FIG. 6B illustrates how the gain error is generated while reading a periodic pattern according to an embodiment of the present invention.

Operation of the gain control 90 is understood with reference to FIG. 6B which shows a substantially sinusoidal read signal generated by reading an NT pattern (e.g., a 2T preamble or a 4T reference pattern in a servo sector). The solid circles represent the measured amplified read signal samples, and the "x"s represent target sample values corresponding to a target amplitude of the amplified read signal. The resulting gain error is used to adjust the gain setting 92 and therefore the gain of the VGA 68. In the example of FIG. 6B, the gain error will increase the gain setting 92 so as to increase the amplitude of the amplified read signal 72 toward the target amplitude.

In one embodiment, a gain error is measured while reading the periodic reference pattern 28 without actually adjusting the gain of the VGA 68 for the current servo sector. This embodiment may provide better performance by using the same VGA 68 gain setting for reading both the periodic reference pattern 28 and the servo bursts 30. For example, maintaining a constant gain setting may improve the accuracy of the resulting PES by improving the measured amplitude and/or phase of the servo bursts 30 relative to the amplitude and/or phase of the periodic reference pattern 28. In one embodiment illustrated in FIG. 7, the gain error 94 measured while reading the periodic reference pattern 28 of a current servo sector is used to adjust the amplitude of the read signal while reading the next servo sector. This embodiment enables use of the gain error information generated over the periodic reference pattern 28 even though it may not be used to adjust the amplitude of the read signal for the current servo sector. In one embodiment, the gain error 94 applied to the next servo sector is generated by averaging the gain error over the periodic reference pattern 28 of the current servo sector. However, any suitable technique may be used to generate the gain error 94 in response to the periodic reference pattern 28, such as by computing an amplitude of the fundamental frequency in the read signal using a Fourier transform.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a disk comprising a plurality of data tracks defined by servo sectors, wherein each servo sector comprises a periodic preamble recorded at a first frequency, servo data, a periodic reference pattern recorded at a second frequency different from the first frequency, and at least one servo burst;
    a head actuated over the disk; and
    control circuitry operable to process a servo sector by:
        processing the periodic preamble to extract the servo data;
        demodulating the servo burst in response to the periodic reference pattern;
        generating a position error signal based on the extracted servo data and the demodulated servo burst; and
        measuring a fly height of the head based on the periodic reference pattern,
        wherein the at least one servo burst comprises at least one phase based servo burst.

2. The disk drive as recited in claim 1, wherein the periodic reference pattern is radially coherent across at least four radially consecutive servo sectors.

3. The disk drive as recited in claim 1, wherein the first frequency is twice the second frequency.

4. The disk drive as recited in claim 1, wherein the second frequency substantially matches a frequency of the servo burst.

5. The disk drive as recited in claim 1, wherein the at least one servo burst comprises at least one amplitude based servo burst.

6. The disk drive as recited in claim 1, wherein the control circuitry is further operable to:
    generate a read signal by reading the phase based servo burst and the periodic reference pattern;
    rotate a phase of the read signal relative to a phase of the periodic reference pattern; and
    demodulate the phase based servo burst by demodulating the phase rotated read signal.

7. The disk drive as recited in claim 1, wherein the control circuitry is further operable to:
    generate a read signal by reading the servo burst and the periodic reference pattern;
    measure a burst amplitude of the read signal representing the servo burst and a reference amplitude of the read signal representing the periodic reference pattern;
    normalize the burst amplitude based on a reference amplitude; and
    demodulate the phase based servo burst by demodulating the normalized burst amplitude.

8. The disk drive as recited in claim 1, wherein the control circuitry is further operable to measure the fly height of the head by:
    generating a read signal by reading the periodic reference pattern; and
    filtering the read signal to extract a first harmonic and a second harmonic of the second frequency.

9. The disk drive as recited in claim 1, wherein the periodic reference pattern is recorded on the disk after the servo data and before the servo burst.

10. The disk drive as recited in claim 1, wherein the periodic reference pattern is recorded on the disk after the servo data and after the servo burst.

11. The disk drive as recited in claim 1, wherein the control circuitry is further operable to:
    generate a first read signal by reading a first servo sector;
    measure a gain error of the first read signal in response to the periodic reference pattern in the first servo sector;
    generate a second read signal by reading a second servo sector following the first servo sector; and
    adjust an amplitude of the second read signal in response to the gain error.

12. A method of operating a disk drive, the disk drive comprising a disk comprising a plurality of data tracks defined by servo sectors, wherein each servo sector comprises a periodic preamble recorded at a first frequency, servo data, a periodic reference pattern recorded at a second frequency different from the first frequency, and at least one servo burst, and a head actuated over the disk, the method comprises processing a servo sector by:
    processing the periodic preamble to extract the servo data;
    demodulating the servo burst in response to the periodic reference pattern;
    generating a position error signal based on the extracted servo data and the demodulated servo burst; and
    measuring a fly height of the head based on the periodic reference pattern,
    wherein the at least one servo burst comprises at least one phase based servo burst.

13. The method as recited in claim 12, wherein the periodic reference pattern is radially coherent across at least four radially consecutive servo sectors.

14. The method as recited in claim 12, wherein the first frequency is twice the second frequency.

15. The method as recited in claim 12, wherein the second frequency substantially matches a frequency of the servo burst.

16. The method as recited in claim 12, wherein the at least one servo burst comprises at least one amplitude based servo burst.

17. The method as recited in claim 12, further comprising:
    generating a read signal by reading the phase based servo burst and the periodic reference pattern;
    rotating a phase of the read signal relative to a phase of the periodic reference pattern; and
    demodulating the phase based servo burst by demodulating the phase rotated read signal.

18. The method as recited in claim 12, further comprising:
    generating a read signal by reading the servo burst and the periodic reference pattern;
    measuring a burst amplitude of the read signal representing the servo burst and a reference amplitude of the read signal representing the periodic reference pattern;

normalizing the burst amplitude based on a reference amplitude; and demodulating the phase based servo burst by demodulating the normalized burst amplitude.

19. The method as recited in claim 12, further comprising measuring the fly height of the head by:

generating a read signal by reading the periodic reference pattern; and filtering the read signal to extract a first harmonic and a second harmonic of the second frequency.

20. The method as recited in claim 12, wherein the periodic reference pattern is recorded on the disk after the servo data and before the servo burst.

21. The method as recited in claim 12, wherein the periodic reference pattern is recorded on the disk after the servo data and after the servo burst.

22. The method as recited in claim 12, further comprising:

generating a first read signal by reading a first servo sector;

measuring a gain error of the first read signal in response to the periodic reference pattern in the first servo sector;

generating a second read signal by reading a second servo sector following the first servo sector; and adjusting an amplitude of the second read signal in response to the gain error.

* * * * *